United States Patent
Kitaguchi et al.

[11] Patent Number: 5,560,842
[45] Date of Patent: Oct. 1, 1996

[54] SPOT WELDING APPARATUS AND ITS POWER SUPPLYING METHOD

[75] Inventors: Shinichi Kitaguchi, Ebina; Shigeo Tsuyuki, Isehara, both of Japan

[73] Assignee: Amada Metrecs Company, Limited, Kanagawa, Japan

[21] Appl. No.: 448,107

[22] Filed: May 23, 1995

[30] Foreign Application Priority Data

May 26, 1994 [JP] Japan .................. 6-112628

[51] Int. Cl.⁶ ................................ B23K 11/24
[52] U.S. Cl. ................................ 219/108
[58] Field of Search ................. 219/108, 110, 219/117.1

[56] References Cited

U.S. PATENT DOCUMENTS

| | | | |
|---|---|---|---|
| 3,051,825 | 8/1962 | Rockafellow et al. | 219/108 |
| 3,153,728 | 10/1964 | Procter | 219/108 |
| 3,422,243 | 1/1969 | Meyer | 219/110 |
| 4,985,612 | 1/1991 | Izume et al. | 219/110 |
| 5,072,090 | 12/1991 | Morita | 219/108 |
| 5,166,491 | 11/1992 | Izume et al. | 219/110 |
| 5,171,960 | 12/1992 | Takano et al. | 219/108 |
| 5,449,876 | 9/1995 | Ko | 219/108 |

FOREIGN PATENT DOCUMENTS

| | | |
|---|---|---|
| 0389704 | 3/1989 | European Pat. Off. |
| 4101648C1 | 6/1992 | Germany. |
| 59-45086 | 3/1984 | Japan. |

*Primary Examiner*—Clifford C. Shaw
*Attorney, Agent, or Firm*—Wigman, Cohen, Leitner & Myers, P.C.

[57] ABSTRACT

A spot welder apparatus includes: a single welding power source (5); a welding current distributor (7) connected to the single welding power source; and a plurality of spot welders (1A, 1B, 1C) connected to the welding current distributor. Each of a plurality of the spot welders is activated alternately by welding current distributed by the welding current distributor. When two start signals are generated almost simultaneously, a first spot welder which generates the start signal earlier is activated, and a second spot welder which generates the start signal later is kept under pressurized condition. Immediately after the first spot welder is deactivated, the second spot welder is then activated. The spot welder apparatus is low in cost and small in installation space, without increasing the user' current capacity.

3 Claims, 3 Drawing Sheets

SPOT WELDING APPARATUS AND ITS POWER SUPPLYING METHOD

BACKGROUND OF THE INVENTION

1. Field of the Invention

The present invention relates to a spot welding apparatus and a method of supplying power to the spot welding apparatus, and more specifically to the spot welding apparatus for spot-welding a plurality of objects to be welded by use of a plurality of spot welders.

2. Description of Related Art

Conventionally, welding power is supplied to the primary coil of a transformer provided for each spot welder. In other words, a single spot welder is generally activated by a single welding power source.

In the conventional spot welder, however, since the power is supplied from a single welding power source to a single transformer thereof, when a plurality of spot welders are arranged, a transformer and a spot welding power source must be provided for each spot welder, respectively. As a result, it has been necessary to purchase the transformers and the welding power sources (the most expensive units) together for a plurality of spot welders.

In addition, since a plurality of user's breakers (the same as the number of the welding power sources) are necessary, there exists another problem in that the capacity of the incoming power increases and therefore the installation space therefor also increases.

SUMMARY OF THE INVENTION

Accordingly, it is the object of the present invention to provide a spot welding apparatus and a spot welding power supplying method, by which the manufacturing cost thereof, the user's breaker capacity, the number of the breakers, and the installation space can be all reduced.

To achieve the above-mentioned object, the present invention provides a spot welder apparatus, comprising: a single welding power source (5); a welding current distributor (7) connected to said single welding power source; and a plurality of spot welders (1A, 1B, 1C) connected to said welding current distributor, each of said spot welders being activated alternately by welding current distributed by said welding current distributor.

Further, the welding current distributor includes: a branch unit (11); a memory unit (12) for storing a number of welding programs; a microprocessor (10) for controlling welding procedure of all the spot welders in accordance with a selected one of the welding programs stored in said memory unit; and a plurality of automatic switches (13A, 13B, 13C) connected between said branch unit and said spot welders, respectively, for activating and deactivating said spot welders in accordance with the selected program.

Further, each of said spot welders comprises: a transformer (23) having a primary coil connected to each of said automatic switch (13) and a secondary coil connected to each welding electrode (3); a start switch (28) for generating a welding start signal; and a digital switch (29) for selecting one of the welding programs stored in the memory unit of said welding current distributor.

Further, the present invention provides a spot welding apparatus having a single welding power source (5), a welding current distributor (7) connected to said single welding power source; and plurality of spot welders (1A, 1B, 1C) connected to said welding current distributor, characterized in that each of the spot welders are activated alternately by welding current distributed by the welding current distributor controlled in accordance with a welding program stored therein.

Further, the present invention provides a method of activating a plurality of spot welders by a single welding current source, which comprises the steps of: checking whether start signals are generated by a plurality of the spot welders, cyclically; when a plurality of start signals are generated almost simultaneously, activating a first spot welder which first generates the start signal; keeping other remaining spot welders which generate the start signal later, respectively under pressurized conditions; activating the second spot welder which secondly generates the start signal, immediately after the first spot welder has been deactivated; and repeating the above step to activate the spot welders in sequence of the start signals generated.

In the sport welding apparatus and the spot welding power supplying method according to the present invention, since a plurality of the spot welders can be activated alternately by welding current distributed by the welding current distributor, it is possible to reduce the number of spot welding power sources, the installation space, and the cost thereof.

DETAILED DESCRIPTION OF THE EMBODIMENTS

An embodiment of spot welding apparatus according to the present invention will be described hereinbelow with reference to the attached drawings.

Figure 1:
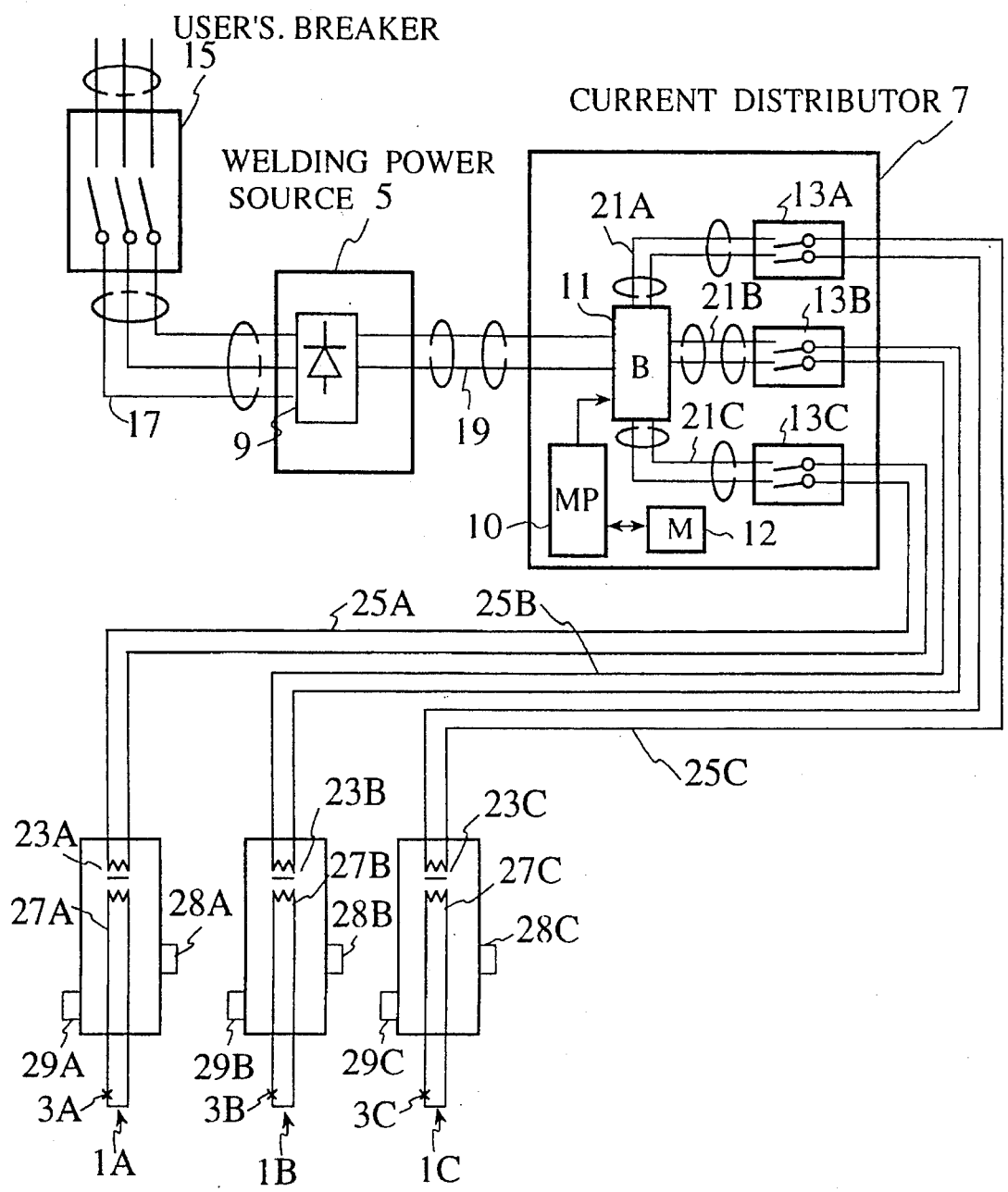
FIG. 1 is a schematic block diagram showing the spot welding apparatus according to the present invention.

In FIG. 1, the spot welding apparatus according to the present invention provides a user's breaker 15, a welding power source 5 connected to the user's breaker, a welding current distributor 7 connected to the welding power source 5, and a plurality of spot welders 1A, 1B and 1C.

The welding power source 5 has a rectifier 9. The welding current distributor 7 includes a branch unit 11, three automatic switches 13A, 13B and 13C, a microprocessor 10, a memory unit 12, etc. Each of the spot welders 1A, 1B and 1C has a welding electrode 3A, 3B or 3C, a transformer 23A, 23B or 23C, a start switch 28A, 28B or 28C, a digital switch 29A, 29B or 29C. The welding electrode 3 is attached to an end of a welding gun (not shown) for pressurizing and spot welding an object to be welded.

Further, the current distributer 7 is connected between the welding power source 5 and the respective spot welders 1A, 1B and 1C to supply the welding current to the welding electrodes 3A, 3B and 3C of the spot welders 1A, 1B and 1C, respectively. Further, the user's breaker is connected to the rectifier 9 of the welding power source 5 through a power cable 17. The rectifier 9 is connected to the branch unit 11 through a power cable 19. The branch unit 11 is connected to the respective automatic switches 13A, 13B and 13C via power cables 21A, 21B and 21C, respectively. Further, the respective automatic switches 13A, 13B and 13C are connected to the primary coils of transformers 23A, 23B and 23C housed in the spot welders 1A, 1B and 1C through the power cables 25A, 25B and 25C, respectively. On the other hand, the secondary coils of the transformers 23A, 23B and 23C are connected to the spot welding electrodes 3A, 3B and 3C of the spot welders through power cables 27A, 27B and 27C, respectively.

Further, the spot welders 1A, 1B and 1C are provided with digital switches 29A, 29B and 29C, respectively. When each of these digital switches 29A, 29B and 29C is turned on, any one of a plurality welding programs stored in the memory unit 12 of the current distributor 7 can be selected. The welding program determines the welding sequence (priority) of the spot welders, the welding pressure (inclusive of the dressing pressure), the welding pressure duration time, the welding current value, the welding current duration time, etc., so that the welding current distributor 7 can be controlled by the microprocessor 10 thereof in accordance with the selected program.

For instance, when two spot welders 1A and 1B are arranged, 1st to 8th programs can be selected by the digital switch 29A, and 9th to 15th programs can be selected by the digital switch 29B. However, when programs other than 1st to 8th programs are selected by the digital switch 29A, the current distributor 7 will not supply current, and when programs than 9th to 15th programs are selected by the digital switch 29B, the current distributor 7 will not supply current.

Figure 2:
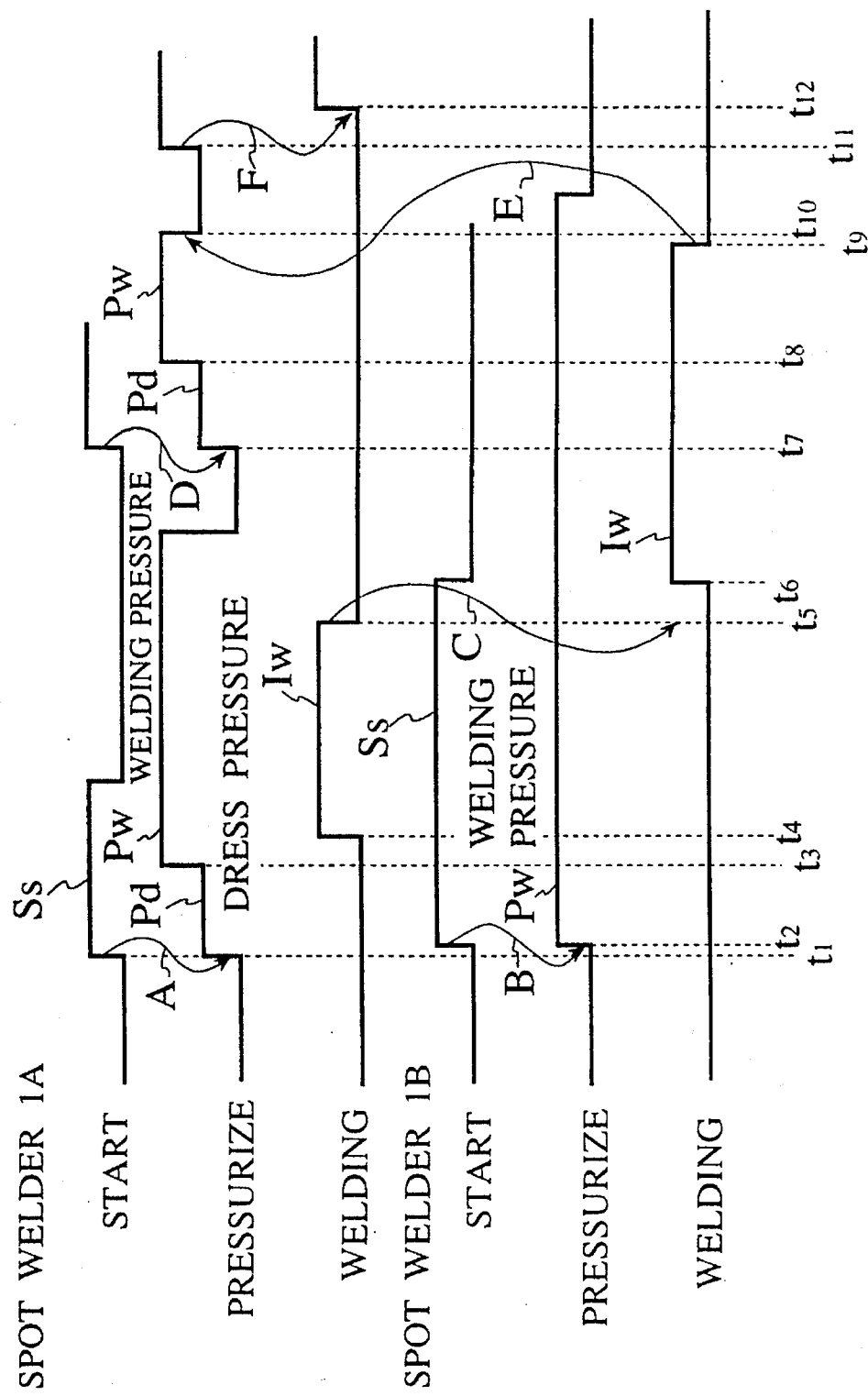
FIG. 2 is a timing chart for assistance in explaining the welding operation sequence of the present invention, in which welding current is supplied to two spot welders from a single current distributor.

Here, a plurality of the spot welders are activated in parallel to each other alternately as follows:

As shown in FIG. 2, when two spot welders 1A and 1B of the three spot welders 1A, 1B and 1C are used and further when a start signal Ss is generated by the start switch 28A of the spot welder 1A at time t1 a little before the start switch 28A of the spot welder 1B generates a start signal Ss at time t2, the pressure of the spot welder 1A is set to a dressing pressure Pd as shown by (A). On the other hand, the pressure of the spot welder 1B is set to a welding pressure Pw at time t2 as shown by (B).

After that, in the spot welder 1A, the dressing pressure Pd changes to the welding pressure Pw (pressurized state) at time t3, and further welding current Iw is passed through the welding electrode 3A of the spot welder 1A at time t4.

During this time, in the spot welder 1B, a welding pressure Pw is kept after time t2. However, immediately after the spot welder 1A is deactivated and the welding current Iw ends at time t5, welding current Iw is passed through the welding electrode 3B of the spot welder 1B at time t6. During the welding operation of the spot welder 1B, since a succeeding start signal Ss is generated by the spot welder 1A at time t7 as shown in by (D), in the spot welder 1A, the dressing pressure Pd is generated at time t7 and further the welding pressure Pw is generated at time t8. Under these conditions, when the spot welder 1B is deactivated and the welding current Iw ends at time t9, in the spot welder 1A, the pressure is once dropped down to the dressing pressure Pd at time t10 and then raised up to the welding pressure Pw at time 11. After that, welding current Iw is passed therethrough at time t12 again, as shown by (F).

Figure 3:
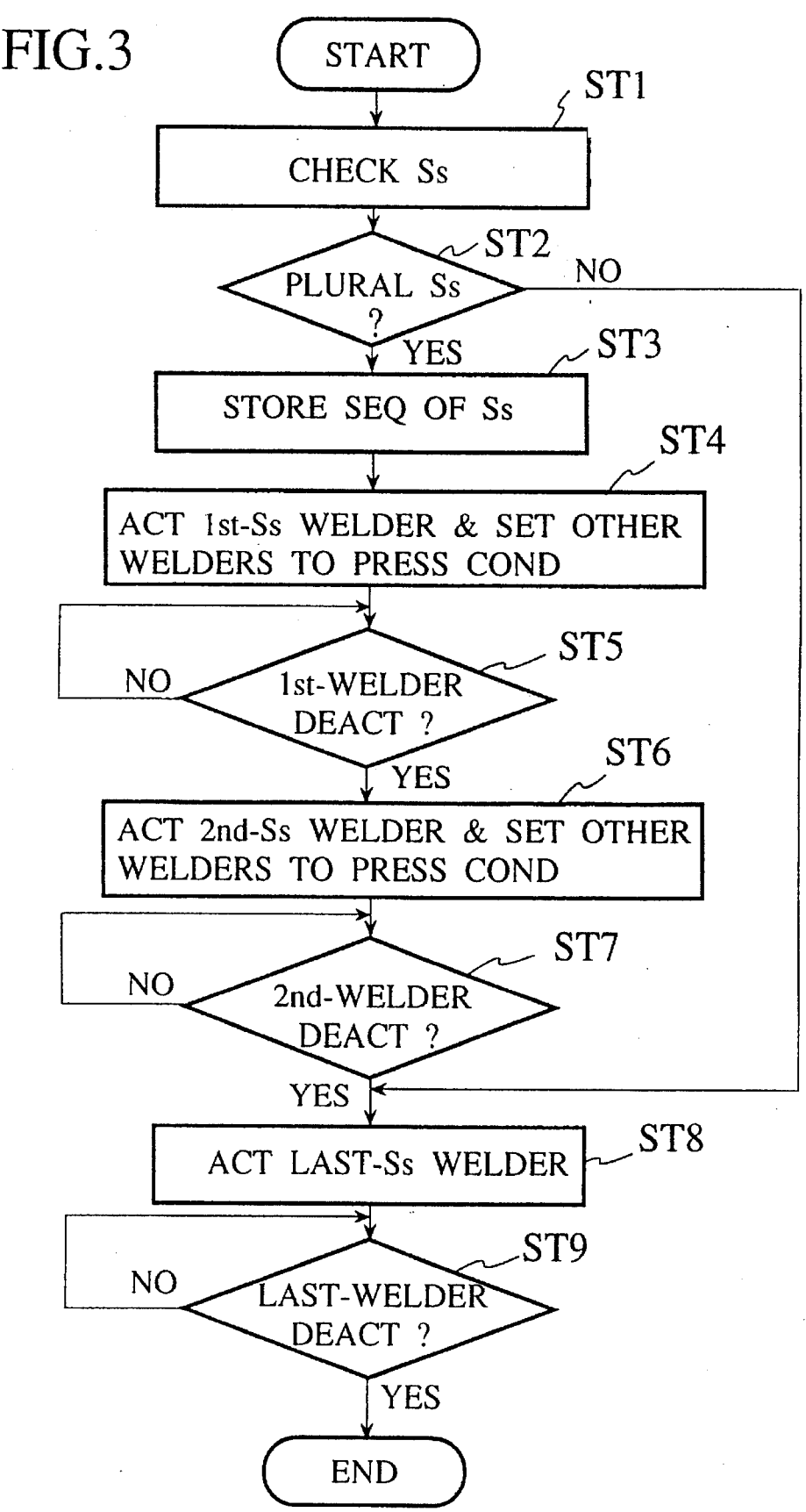
FIG. 3 is a flowchart for assistance in explaining the welding operation sequence of the present invention.

With reference to FIG. 3, the more generic welding procedure of the spot welding apparatus according to the present invention will be described hereinbelow.

First, when one of the welding program stored in the memory unit 12 of the welding current distributor 7 is selected by the digital switch 28 of the spot welder 3, the microprocessor 10 control the total welding operation (the pressure value, the pressure duration time, the current value, the current duration time, etc.) of the spot welding apparatus in accordance with the selected program.

The microprocessor (referred to as a control, hereinafter) 10 checks whether start signals Ss are generated by the respective spot welders 1 (in step ST1), and further whether a plurality of start signals Ss have been generated simultaneously (in step ST2). If NO; that is, if only one start signal Ss has been generated, control proceeds to step ST8 to activate the spot welder 1 which generates the start signal Ss. To activate the spot welder, first a low dressing pressure and then a high welding pressure is applied to the electrode. After that, welding current Iw is passed through the spot welder. Further, control checks whether a predetermined time duration (determined by the program) has elapsed and thereby the spot welder is deactivated (in step ST9). If YES, control ends.

In step ST2, if YES; that is, if a plurality of start signals have been generated simultaneously, control stores the sequence of the generated start signals Ss (in step S3). Further, control activates the spot welder which has first generated the start signal (first-start signal spot welder), and sets the other remaining spot welders to the welding pressure condition (in step ST4). Further, control checks whether the first-start signal spot welder has been deactivated after a predetermined time has elapsed (in step ST5). If YES, control activates the spot welder which has secondly generated the start signal (second-start signal spot welder), and sets the other remaining spot welders to the welding pressure condition (in step ST6). Further, control checks whether the second-start signal spot welder has been deactivated after a predetermined time has elapsed (in step ST7). The similar procedure as describe above is repeated by the number of the spot welders.

Further, control proceeds to step ST8 to activate the spot welder which generates the last start signal Ss. Further, control checks whether a predetermined time duration has elapsed and thereby the last spot welder is deactivated (in step ST9). If YES, control ends.

As described above, a plurality of the spot welders can be activated alternately by activating only one spot welder (which generates the start signal earlier) and by setting the other remaining spot welders to the welding pressure (pressurized) condition in the sequence of the start signals.

Here, since the current duration time is usually from 200 to 400 ms, even if a plurality of spot welder are activated at the same time, there exists no substantial time delay (the waiting time), as compared with the conventional spot welder each having an individual welding power source.

In the spot welder apparatus according to the present invention, since the current distributor 7 is provided, even if a plurality of spot welders 1A, 1B and 1C are used, it is possible to supply welding current to a plurality of spot welders 1A, 1B and 1C alternately, by selectively closing any one of the automatic switches 13A, 13B and 13C. In more detail, when a start signal is generated and applied to the current distributor 7, only the automatic switch 13A is closed, for instance to supply welding current to only the spot welder 1A, without closing the automatic switches 13B and 13C, so that it is possible to prevent welding current from being supplied to the other spot welder simultaneously.

Further, in the spot welder apparatus, since the primary current (e.g., 600 A) of each of the transformers 23A, 23B and 23C is passed or interrupted by each of the automatic switches 13A, 13B and 13C, it is possible to prevent the contacts of the automatic switches from being consumed and therefore to reduce the size of the contacts. This is because since the secondary current of each of the transformers 23A, 23B and 23C is as large as about 20,000 A, a large switch must be used to pass or interrupt a large current.

As described above, in the spot welder apparatus according to the present invention, since the current distributor 7 is connected to a single welding power source 5 and further a plurality of spot welders 1A, 1B and 1C are activated alternately by the single welding power source through the single distributing welding current appropriately, it is possible to reduce the manufacturing cost of the plural spot welders, the capacity of the user's breaker, the number of the breaker and installation space.

What is claimed is:

1. A spot welder apparatus, comprising:

a single welding power source (5);

a plurality of spot welders (1A, 1B, 1C) activated by welding current supplied by said single welding power source (5);

a welding current distributor (7) connected between said single welding power source (5) and said spot welders (1A, 1B, 1C) for distributing the welding current for said spot welders (1A, 1B, 1C) selectively, said welding current distributor (7) including;

a branch unit (11);

control means for controlling an operation of said branch unit (11);

a plurality of automatic switches (13A, 13B, 13C) connected between said branch unit (11) and said spot welders (1A, 1B, 1C), respectively, for activating and deactivating said spot welders; and wherein said control means executes the steps of:

cyclically checking whether start signals have been generated by a plurality of said spot welders (1A, 1B, 1C);

activating said branch unit (11) so as to supply welding current to a first one of said plurality of spot welders which first generates a start signal while keeping the remaining ones of said plurality of spot welders under electrically pressurized conditions;

activating said branch unit (11) so as to supply welding current to a next one of said plurality of spot welders which next generated a start signal, after said first one of said plurality of spot welders has been deactivated; and repeating the above steps so that each one of said plurality of spot welders are activated in sequence of the start signals generated.

2. The spot welder apparatus of claim 1, wherein said control means includes:

a memory unit (12) for storing a number of welding programs; and a microprocessor (10) for controlling a welding procedure of all of the plurality of spot welders in accordance with a selected one of the welding programs stored in said memory unit.

3. The spot welder apparatus of claim 2, wherein each of said plurality of spot welders (1A, 1B, 1C) comprises:

a transformer (23) having a primary coil connected to one of each of said plurality of automatic switchs (13) and a secondary coil connected to each welding electrode (3);

a start switch (28) for generating a welding start signal; and a digital switch (29) for selecting one of the welding programs stored in said memory unit (12) of said control means.

* * * * *